July 24, 1951 G. A. TINNERMAN 2,562,001
FASTENING DEVICE
Filed May 13, 1948 2 Sheets-Sheet 1

Inventor
GEORGE A. TINNERMAN
By H. G. Lombard
ATTORNEY

July 24, 1951 G. A. TINNERMAN 2,562,001
FASTENING DEVICE
Filed May 13, 1948 2 Sheets-Sheet 2
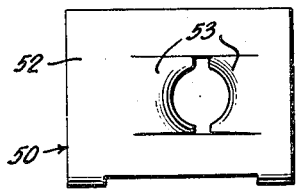
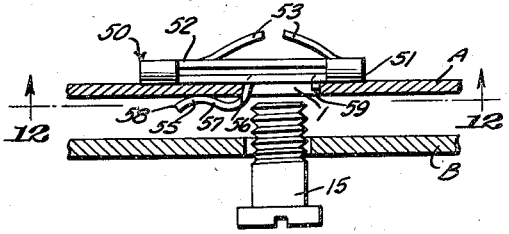
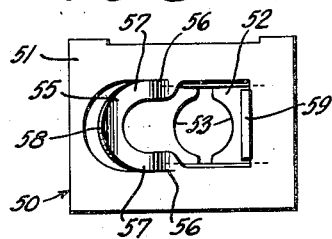
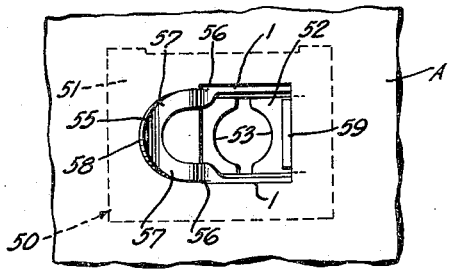
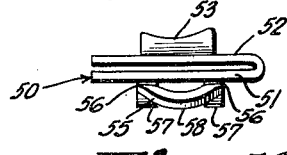
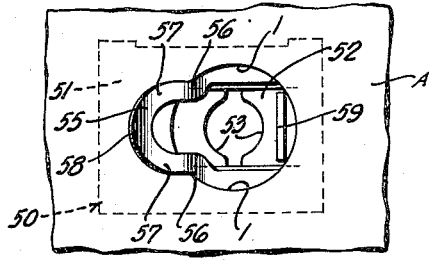
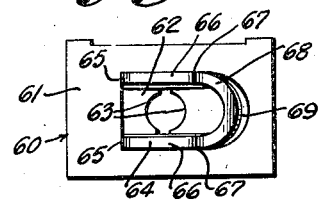
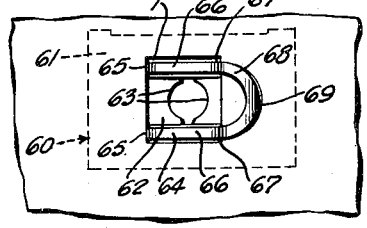
Inventor
GEORGE A. TINNERMAN
By H. G. Lombard
ATTORNEY Patented July 24, 1951

2,562,001

UNITED STATES PATENT OFFICE 2,562,001

FASTENING DEVICE

George A. Tinnerman, Cleveland, Ohio, assignor to Tinnerman Products, Inc., Cleveland, Ohio, a corporation of Ohio Application May 13, 1948, Serial No. 26,896

3 Claims. (Cl. 151—41.75)

This invention relates to attachable types of fastening devices designed for ready attachment to an apertured supporting part to provide the same with means for securing a cooperating part thereto or for securing another structure, object or article of manufacture to said supporting part. The invention is directed, more particularly, to clip type fastening devices which comprise means for attaching the fastener in a single, relatively small opening in a supporting part together with means for threadedly engaging a bolt or screw fastener to secure a cooperating part to the supporting part, or other means for retaining an object or part in secured relation to the supporting part.

The improved fasteners of the invention are of the general type having attaching means which comprise a hook, or the like, which is applied to clasping engagement with the marginal edge portion of an opening in a part together with a locking shoulder or abutment also receivable in the opening to lock such attaching hook in the applied fastening position of the fastener. In many assemblies, the nature of the installation is such that only a single, relatively small assembling opening or recess in a part to be secured is permissible or advisable to attach a nut or other type of fastener for securing the parts of the installation. The most desirable attachment of a fastener in such instances is one in which the complete attachment is effected within the assembling opening in a manner which minimizes the attaching elements required on the fastener and which dispenses with the requirement for separate holes in the supporting part for the application of auxiliary attaching means such as rivets, welding and the like to retain the fastener in attached position.

A primary object of the invention is to provide a sheet metal fastening device of this character which may be inexpensively constructed with an improved type of attaching means in the form of a simplified clasp or hook that is particularly adapted for a locked attachment in a relatively small opening in a part to retain the fastening device in fastening position against displacement or removal without the use of extraneous, auxiliary attaching means.

A further object of the invention is to provide a fastening device such as described in which the attaching means comprises a hook, arm, or the like, which also defines the locking means for retaining the fastening devices in applied fastening position against displacement or removal.

Another object of the invention is to provide a fastening device of the kind aforesaid in which the attaching means comprises an open or apertured type of hook which is adapted to pass a bolt or screw applied to a nut or thread portion on the fastener body.

A further object of the invention is to provide such a fastening device in which the open or apertured attaching hook is adapted for attaching the fastener and for passing a cooperating bolt or screw, as aforesaid, and otherwise comprises spaced shoulder elements for locking the fastener in attached fastening position.

Another object of the invention is to provide attachable fastening devices such as described which comprises doubled body portions of high strength and durability for use in heavy duty installations.

Further objects and advantages, and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Fig. 8 is a top plan view of a fastener having a doubled fastener body for heavy duty installations and an alternate form of attaching means;

Fig. 9 is a bottom plan view of the fastener shown in Fig. 8;

Fig. 10 is an end view of the fastener shown in Fig. 8;

Fig. 11 is a sectional view showing the fastening device of Figs. 8–10 inclusive in applied fastening position on a supporting part for receiving a bolt or screw fastening securing a cooperating part thereto;

Fig. 12 is a sectional view of Fig. 11, along line 12—12, showing the attaching means of this form of fastener as applied to a generally rectangular opening in the supporting part; and, Fig. 13 is a similar view to Fig. 12 showing the fastener in attached fastening position in a generally circular opening in a supporting part.

Fig. 14 is a bottom plan view of another form of fastening device having a doubled fastener body and attaching means in accordance with the invention;

Fig. 15 is a side elevational view of the fastener of Fig. 14 in attached fastening position on a supporting part, represented in section; and, Fig. 16 is a bottom plan view of Fig. 15, along line 16—16, showing the fastening device in attached fastening position in a generally rectangular opening in a supporting part.

The improved fastening devices of the invention are of general utility and may be readily designed as necessary for use in various installations in proportion to the size and contour of the parts secured. The fastening devices are particularly suited for use in providing an apertured supporting part with means for securing a cooperating part thereto by an operation taking place entirely from one side thereof as required in a blind location, for example. In this relation, each form of the invention in the present disclosure relates to the provision of a fastening device having screw threaded fastener receiving means and otherwise comprising an attaching means designed to hold the fastening device in a self sustaining fastening position on the supporting part preparatory to the application of a threaded fastener thereto for securing a cooperating part to such supporting part. In other installations, the fastening devices may be provided in the manner of holders or retainers for ordinary threaded nuts or retaining means for securing a molding, conduit, cable or other object or article of manufacture. In any form, the fastener comprises an improved attaching means which is particularly suitable for attachment in a relatively small bolt opening or assembling opening in the supporting part and which provides for the complete attachment of the fastener within any such opening.

Figure 1:
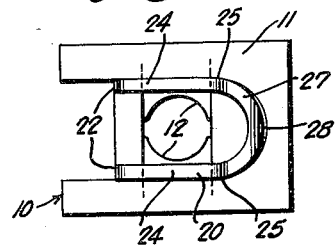
Fig. 1 is a bottom plan view of a form of an attachable nut fastening device in accordance with the invention showing the formation of the improved attaching means.
Figure 2:
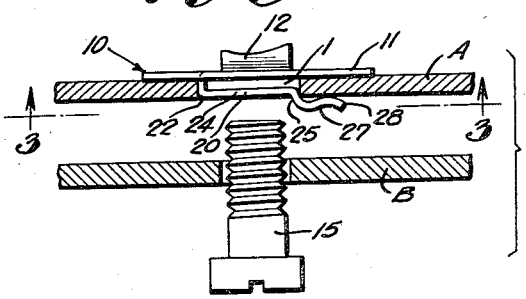
Fig. 2 is a sectional view showing the fastening device of Fig. 1 in attached fastening position on a supporting part for receiving a bolt fastening securing a cooperating part thereto.
Figure 4:
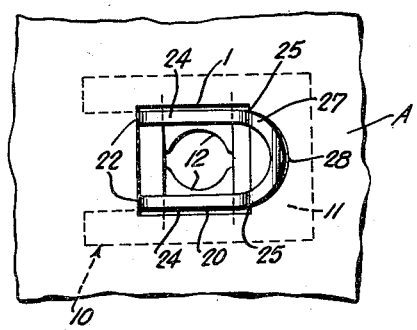
Figure 3:
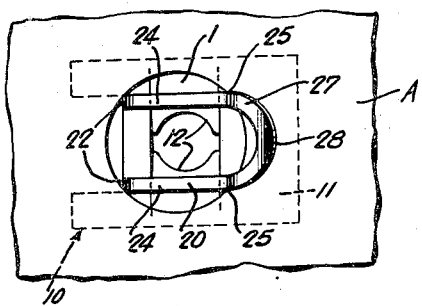
Fig. 3 is a sectional view of Fig. 2 along line 3—3, looking in the direction of the arrows, showing the improved attaching means of the fastener in applied position in a generally circular opening in the supporting part; and, Fig. 4 is a view similar to Fig. 3 showing the improved attaching means of the fastener in applied position in a generally rectangular opening in the supporting part.

Referring now, more particularly, to the drawings, Figs. 1 to 4 inclusive show one embodiment of the improved fastener which comprises a strip, plate or other sheet metal body provided with means for threadedly engaging a bolt or screw for securing superposed apertured parts. The supporting part A to which the fastener is attached may be of any suitable material such as sheet metal, wood, fiber board, or the like; however, inasmuch as the instant invention is employed mainly in metallic structures, the supporting part is usually in the form of a metallic panel or plate-like element provided with the necessary bolt openings along which the object or part to be secured thereto extends in mounted position thereon. Such bolt openings are so provided as to serve both as an assembling opening for attaching the fastener and as a passage for the bolt applied to the fastener. As shown in Fig. 3, the bolt opening 1 may be a simple circular hole, or, as seen in Fig. 4, a generally rectangular aperture or of any other suitable design or configuration.

The fastener, designated generally 10, comprises a relatively small, inexpensive blank of sheet metal which is best provided in the manner of a simple section severed from standard sheet metal strip stock with minimum loss or waste of material. Any suitable sheet metal may be employed but preferably that of a spring metal nature such as spring steel or cold rolled steel having spring characteristics and otherwise of a much greater tensile and compressive strength than the supporting part A to which the fastening device is attached. The fastening device may assume any desired shape or configuration and in any form defines a base or body 11 which is provided with bolt or screw thread engaging means 12 adapted to receive a threaded fastener 15 for securing the superposed apertured parts A, B, in an installation such as shown in Fig. 2, for example.

The sheet metal base 11 is provided with integral tongues 12 or similar bolt engaging means which are pressed, extruded, or otherwise struck and formed to project upwardly out of the plane thereof for threadedly engaging a bolt or screw fastener, substantially in the manner of a nut. Preferably the sheet metal base 11 is so formed in the stamping operation as to present a slightly arched resilient base from which said tongues 12 extend upwardly in substantially ogee formation with the extremities thereof so spaced as to lie on a helix corresponding substantially to the pitch of the threads of the bolt or screw fastener 15 for most effective, uniform threaded engagement therewith.

The thread engaging elements 12 are best provided in the sheet metal body by an aperture intermediate spaced parallel slits which form cooperating tongues, or the like, having spaced extremities defining the desired thread or thread opening corresponding substantially to the root of the bolt or screw for threadedly engaging the thread thereof. Said tongues 12 otherwise are preferably formed to project upwardly out of the plane of the fastener base and are bent lengthwise in substantial ogee formation to provide for the maximum strength obtainable to withstand the tightening action of the bolt or screw as it is advanced to final applied fastening position.

Such thread engaging means may be pressed, stamped, extruded, or otherwise provided on the fastener in any suitable form or construction so long as the same threadedly engage with the thread of the bolt or screw and, in this relation, the present invention fully contemplates the provision of such thread engaging means in various other similar and related forms, as in the manner of a keyhole type of thread opening, or a perforated protuberance which is pressed from the sheet metal base and shaped to provide a helical thread or thread opening, or otherwise has the walls thereof tapped to provide a plurality of threads for threadedly engaging the bolt or screw. However, it has been found that such thread engaging means prepared in the form of cooperating, yieldable tongues 12 as shown, are most efficient and practical in that they are possessed of unusual inherent strength and will not collapse or pull through when the bolt is tightened, nor loosen under continuous strain and vibration in the installation. This takes place by reason of the fact that the sheet metal material from which such tongues are formed is of less thickness than the pitch or spacing between adjacent thread convolutions on the bolt or screw, wherefore the extremities of said tongues tend, more effectively, to move toward each other and dig into the grooves intermediate adjacent thread convolutions when the bolt or screw is tightened and otherwise become embedded in the root of the bolt or screw in locked, frictional fastening engagement therewith.

Thus, in the present example, the tongues 12 are shown as extending outwardly out of the plane of the fastener base 11 in substantial ogee design and provided preferably with notched extremities, defining substantial biting jaws adapted to cut into the root of the bolt and the adjacent thread surfaces thereon in positive locking relation therewith in the most effective manner. There is thereby eliminated the necessity for a separate, auxiliary locking means such as a lock nut or lock washer and this, in mass production methods of assembly makes possible considerable savings not only in the cost of such locking devices, but also, in the expense and labor involved in the tedious, time-consuming assembling operations and other added steps in manufacture which such auxiliary locking means require. It is to be understood, however, that the present invention is not limited in any manner or form to the illustrated construction of the thread engaging means but rather, comprehends also, various other similar and related forms of such tongues or equivalent thread engaging elements.

The attaching portion of the fastener is designed to hold the fastener in self-sustained position on the supporting part A, as shown in Fig. 2, with the stud engaging tongues 12 in alignment with the bolt opening 1 therein preparatory to the application of the bolt or screw 15 in securing a cooperating part B to said supporting part A by an operation taking place entirely from the outer side of the installation.

The attaching portion of the fastener comprises an open or perforated type of hook, arm or clasp 20 which not only retains the fastener in attached fastening position over the bolt opening 1 but also provides a passage for the bolt or screw 15 to the thread or nut portion 12 on the base of the fastener. Such an open or perforated type of hook or clasp element 20 is readily provided by a simple return bent extension on the fastener which depends from the central area of the fastener base adjacent the thread engaging means 12. Preferably a portion of the hook, arm or clasp 20 is provided by spaced slits in the fastener base 11 so that the overall size of said fastener base is sufficient to overlap the bolt opening 1 more or less uniformly.

The hook, arm or clasp 20 is return bent in slightly spaced relation to the fastener base so that the return bend defines pronounced shoulders 22 at the junction thereof to the fastener base 11. The arm or hook 20 otherwise comprises spaced fingers 24 extending from the return bent shoulders 22 while the space between said fingers defines an enlarged bolt passage. Such bolt passage may be provided in the arm or hook 20 in any other suitable way, as for example, by a simple circular aperture of sufficient size to pass the bolt or screw to be employed. However, an enlarged opening is preferable to provide for any slight adjustment which may be necessary for the application of the bolt in completing the fastening installation.

The spaced fingers 24 defining the arm or hook merge into spaced shoulders 25 which are spaced from the shoulders 22 a distance approximating the space between opposing wall portions of the bolt opening 1 so as to engage such walls in the attached position of the fastener and lock the same in such attached position against displacement or removal. The free end of the arm or hook outwardly of the shoulders 25 comprises a resilient spring clasping tongue 27 which preferably terminates in an outwardly flared lip 28 that facilitates the initial application of the arm or hook over an edge of the bolt opening 1.

With the fastener 10 thus provided and the supporting part A prepared with either form of bolt opening 1, shown in Figs. 3 and 4, the fastener may be easily and quickly attached to positive locked fastening position on said supporting part with the thread engaging tongue 12 thereof aligned with the bolt opening 1 in said supporting part. This is effected simply by inserting the free end 28 of the resilient hook 20 into and through said bolt opening and sliding the fastener in the direction of said free end of the hook. The outwardly flared lip 28 on the extremity of said arm or hook 20 facilitates this initial step in applying the hook by causing a gradual outward flexing thereof over the edge of the bolt opening. By depressing the base or body 11 of the fastener and simultaneously sliding the fastener forward, the clasping tongue 27 of the arm or hook clear the underside of the supporting part A and permits the fastener to be advanced to its fully applied fastening position to the point at which the shoulders 25 abut the adjacent wall of the bolt opening, substantially as shown in Figs. 2, 3, and 4. In this position, the shoulders 22 defined by the return bends at the junction of the arm or hook to the fastener base are also received in the bolt opening in engagement with an opposite wall thereof inasmuch as they are provided with a predetermined spacing from the forward shoulders 25 for this purpose in order to cooperate therewith in the bolt opening to lock the fastener in fully applied fastening position on the supporting part A.

In this position, the clasping tongue 27 of the arm or hook is in rigid gripping engagement with the marginal portion of the part A adjacent the bolt opening under constant spring tension while the pairs of spaced shoulders 22, 25, cooperate in engagement with opposing walls of the bolt opening under spring tension to lock the fastener in attached position and otherwise prevent endwise displacement or rotative shifting movement of the fastener from its applied fastening position. In the event that the bolt opening 1 is provided in the form of a rectangular slot as shown in Fig. 4, the spaced shoulders 22, 25, engage opposing end walls of the slot, as aforesaid, with the sides of fingers 24 of the arm or hook disposed in abutting engagement with the adjacent straight side-walls of the slot as a further means maintaining the fastener in fixed, non-rotative applied position on the supporting part. This is important upon insertion and turning of the bolt or screw fastening 15, Fig. 2, to threaded fastening engagement with the stud engaging elements 12 in securing the cooperating part B to the supporting part in completing any installation. In a blind assembly, such substantially fixed, non-rotative attachment of the fastener in self retained position on the supporting part is essential inasmuch as the reverse side of the supporting structure is not readily accessible and it becomes impossible or inconvenient for the operator to hold the fastener while inserting and threadedly engaging a bolt or screw with the thread engaging means thereof. In any case, the pairs of shoulders 22, 25, are located to correspond with the contour of the bolt opening employed to engage opposing walls thereof and thereby lock the fastener rigidly in attached position, as aforesaid. It is thereupon a simple matter to complete an installation securing the parts A, B, by passing the bolt 15 through the enlarged opening between the fingers 24 of the hook or other aperture therein into threaded engagement with the thread engaging means 12 on the fastener base.

In the event that it is desired to remove the fastener from attached position, a suitable tool is employed to wedge the fastener base from the supporting part as necessary to displace the shoulders 22 from abutting relation with the wall of the bolt opening, whereupon the fastener may be slid reversely to disengage the attaching arm or hook from the assembling opening and permit the fastener to be removed.

It will be appreciated that in the use of these one-piece fastening devices of the invention the fasteners are admirably suited for attachment in relatively small openings in close quarters. Also, various fastening installations may be provided which are relatively light in weight and superior and more advantageous in many respects than those secured by clinch-on nut devices embodying conventional threaded nuts which require not only lock washers in providing a locked assembly, but also some extraneous means such as spot welding, riveting or cage devices to retain the nuts in applied position on the support preparatory to the application of the bolt fastening thereto.

Figure 5:
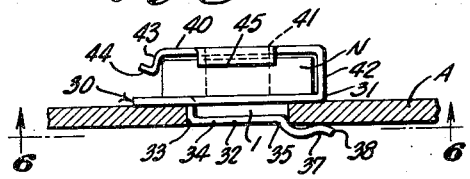
Fig. 5 shows in side elevation another embodiment of the fastening device in the form of a nut holder for retaining a conventional threaded nut in attached fastening position on a supporting part, represented in section.
Figure 6:
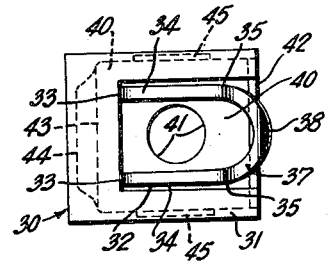
Fig. 6 is a bottom plan view of the fastener per se of Fig. 5 showing the formation of the improved attaching means of the fastener in this form of the invention; and, Fig. 7 is a top plan view of Fig. 5.
Figure 7:
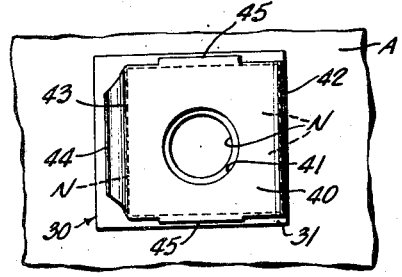

Figs. 5–7 inclusive disclose another form of fastener in accordance with the invention which is provided as a holder for attaching a standard nut or tapped plate in fastening position in an assembly. The fastener 30 is provided with attaching means in the form of a clasping arm or hook 32 or the like which is substantially similar in construction and application to that described with reference to Figs. 1–4 inclusive. The open or perforated arm or hook 32 in this form of the invention is provided in an alternate construction by stamping the same directly from the fastener base 31 to project slightly outwardly out of the plane thereof and thereby define the pronounced spaced shoulders 33 at the junction to the fastener base and spaced fingers 34 providing an enlarged bolt passage therebetween. The spaced fingers 34 merge into spaced shoulders 35 which are spaced from the shoulders 33 a distance approximating the space between opposing walls of the bolt opening 1 in supporting part A so as to engage said walls in the attached position of the fastener and lock the same in such attached position against displacement or removal. The free end of the arm or hook 32 outwardly of the shoulders 35 defines a resilient spring clasping tongue 37 which preferably terminates in an outwardly flared lip 38 that facilitates the initial application of the fastener to attached fastening position.

An extension on the fastener base 31 is bent into an overlying spring arm 40 provided with a bolt passage 41 and comprising a web portion 42 connecting said spring arm 40 in spaced relation to the fastener base 31. A downwardly extending shoulder or flange 43 on the free end of said spring arm 40 terminates preferably in an outwardly flared guide surface 44, while side flanges 45 extend downwardly from opposite sides of said spring arm 40. The arrangement is such that a suitable nut N is readily snapped between the overlying spring arm 40 and the base 31 of the fastener and in such assembled relation, the shoulder or flange 43 on the free end of the spring arm 40 engages the outer end face of the nut and the web portion 42 engages the opposite end face thereof while the side flanges 45 engage the side faces of the nut to retain the same within the nut holder and prevent turning of the nut when a cooperating bolt or screw is applied thereto and rotated to tightened fastening position. Assembly of the nut with the nut holder is facilitated by the outwardly flared guide surface 44 on the free end of the spring arm in that the end face of the nut on being initially applied, engages said guide surface in a camming action to spread the spring arm 40 apart from the fastener base 31 as necessary to admit the nut to assembled relation within the nut holder, whereupon the shoulder 43 on the free end of the spring arm snaps into engagement with the adjacent outer end face of the nut, as aforesaid.

The nut holder is attached in the bolt opening 1 in the supporting part either prior to or after the nut N is assembled therewith substantially as shown in Fig. 5 and the application of the attaching arm or hook 32 to the bolt opening 1 is substantially the same as that described in reference to Figs. 1–4 inclusive. With the combined nut and nut holder attached as shown in Fig. 5, a cooperating part may be readily secured to the supporting part A by a suitable bolt or screw applied through the enlarged opening between the spaced fingers 34 of the attaching arm hook, or other aperture therein, into threaded engagement with the nut N carried by the nut holder.

Figs. 8–13 inclusive disclose another form of the invention in which the body of the fastener 50 comprises doubled over body portions 51, 52, providing for added strength in the fastener as required for heavy duty installations. The upper body portion 52 is provided with suitable means for threadedly engaging the bolt or screw in the manner of a nut and in the present example, said thread engaging means are shown in the form of integral cooperating tongues 53 such as those illustrated in Figs. 1–4 inclusive. A similar open or perforated type of arm or hook 55 is stamped from the lower body portion or base 51 of the fastener in a manner to provide an enlarged passage for the bolt or screw 15, Fig. 11, to be threaded into the nut or thread engaging tongues 53. Said arm or hook 55 otherwise defines spaced shoulders 56 at the junction of said arm or hook with said lower body portion 51 and comprises spaced fingers 57 merging at the free end of said arm or hook into a tongue which preferably terminates in outwardly flared lip 58 that facilitates the initial application of the fastener to attached fastening position. A shoulder 59 defined by a downwardly bent lug or detent is provided on the lower body portion or base 51 in in spaced relation to said spaced shoulders 56 on the arm or hook a distance approximating the spacing between opposing walls of the bolt opening 1 in the supporting part which may be either a generally rectangular aperture as shown in Fig. 12 or a simple circular opening as illustrated in Fig. 13.

This form of the fastener, likewise, is easily and quickly attached to positive locked fastening position on the supporting part A with the thread engaging tongues 53 aligned with the bolt opening 1 in the supporting part A. The attaching operation is effected simply by inserting the free end of the hook 55 into and through the bolt opening 1 and sliding the fastener in the direction of the free end of said arm or hook 55. The outwardly flared lip 58 on the extremity of said arm or hook facilitates the initial application of the hook by causing a gradual outward flexing thereof over the edge of the bolt opening. By depressing the body of the fastener and simultaneously sliding the fastener forward, the arm or hook 55 is forced to clear the underside of the supporting part A as necessary for the fastener to be advanced to its fully applied fastening position in which the spaced shoulders 56 defined by the arm or hook abut the adjacent wall of the bolt opening 1, substantially as shown in Fig. 11. In this position, the projecting locking shoulder or detent 59 is also received in the bolt opening in engagement with an opposite wall thereof inasmuch as it is provided with a predetermined spacing from the shoulders 56 on the arm or hook for this purpose and thereby cooperates therewith in the bolt opening to lock the fastener in fully applied fastening position on the supporting part A. In this position, said arm or hook 55 is in rigid gripping engagement with a marginal portion of part A adjacent the bolt opening under constant spring tension while the locking shoulder or detent 59 cooperates therewith to lock the fastener in attached position and otherwise prevent endwise displacement or rotative shifting movement of the fastener from its applied fastening position. The parts A and B thereupon may be secured in a completed installation simply by passing the bolt 15 through the enlarged opening between the spaced fingers 57 of the arm or hook into threaded engagement with the thread engaging tongues 53 on the upper body portion 52 of the fastener.

Figs. 14–16 inclusive disclose another form of the invention in which the body of the fastener 60 comprises doubled over body portions 61, 62, providing for added strength and durability in the fastener as required for heavy duty installations. The upper body portion 62 is provided with suitable means for threadedly engaging a bolt or screw in the manner of a nut, and in this example, such thread engaging means are shown provided as integral cooperating tongues 63 similar to those described with reference to Figs. 1–4 inclusive. The lower body portion 61 or base of the fastener is provided with an attaching arm or hook 64 similar to that shown and described with reference to Figs. 5–7 inclusive which is stamped directly from the fastener base 61 to project outwardly out of the plane thereof and thereby define the pronounced spaced shoulders 65 at the junction to the fastener base 61 and spaced fingers 66 having an enlarged bolt passage therebetween. The spaced fingers 66 merge into spaced shoulders 67 which are spaced from the shoulders 65 a distance approximating the space between opposing walls of the bolt opening 1 in part A so as to engage said walls in the attached position of the fastener and lock the same in such attached position against displacement or removal. The free end of the arm or hook 64 outwardly of the shoulders 67 defines a resilient spring clasping tongue 68 which preferably terminates in an outwardly flared lip 69 that facilitates the application of the fastener to attached position. In the application of this form of the fastener to attached fastening position, the attaching arm or hook 64 is applied to the bolt opening 1 in part A in substantially the manner described with reference to Figs. 1–4 inclusive and Figs. 5–7 inclusive, whereupon any part or member to be secured to the supporting part A may be readily fastened by a suitable bolt or screw applied through the enlarged passage in the attaching hook 64 to threaded engagement with the thread engaging tongues 63 provided on the upper body portion 62 of the fastener. Accordingly, in this form of the fastener also, the perforated, open type of attaching arm or hook 64 serves not only to attach the fastener in applied fastening position, but also provides an enlarged, readily accessible passage for the bolt fastener that is applied to secure the installation.

In any form of the invention, it will be appreciated that the design of the fastener with an open perforated type of attaching arm or hook enables the attachment of the fastener in a single, relatively small opening in the supporting part without need for additional attaching elements on the fastener to hold the same in attached position while otherwise dispensing with the requirement for separate holes in the supporting part for the application of auxiliary attaching means such as rivets, welding, and the like.

The fastener in any form preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices which are used in installations where extreme vibratory motion takes place. A cheap but effective fastener may be provided from cold rolled metal, such as cold rolled steel, which is untempered but of a spring metal nature and capable of providing an effective and reliable fastening means.

What is claimed is:

1. A fastener for attachment to a part solely in the bolt or screw opening provided in said part, said fastener comprising a sheet metal body bent to define a base larger than said opening in said part and adapted to bear on said part, said base having an aperture and carrying means adjacent said aperture for engaging a bolt or screw, and an arm projecting from the underside of said fastener base and extending in the same general direction, said arm being smaller than said fastener base and having an open area providing a bolt or screw passage aligned with said aperture in the fastener base, said arm being of such size as to be fully receivable in the opening in said part from one side of said part to extend through said opening and engage the other side of said part adjacent said opening and thereby cooperate with the fastener base in engaging opposite sides of said part to retain the fastener in attached position on said part.

2. A fastener for attachment to a part solely in the bolt or screw opening provided in said part, said fastener comprising a sheet metal body bent to define a base larger than said opening in said part and adapted to bear on said part, said base having an aperture and carrying means adjacent said aperture for engaging a bolt or screw, and an arm projecting from the underside of said fastener base and extending in the same general direction, said arm being smaller than said fastener base and having an open area providing a bolt or screw passage aligned with said aperture in the fastener base, said arm being of such size as to be fully receivable in the opening in said part from one side of said part to extend through said opening and engage the other side of said part adjacent said opening and thereby cooperate with the fastener base in engaging opposite sides of said part to retain the fastener in attached position on said part, said arm defining a projecting shoulder adjoining said fastener base adapted to engage the wall of said opening, and another shoulder on said arm engageable with the wall of said opening in spaced relation to said projecting shoulder.

3. A fastener for attachment to a part solely in the bolt or screw opening provided in said part, said fastener comprising a sheet metal body bent to define a base larger than said opening in said part and adapted to bear on said part, said base having an aperture and carrying means adjacent said aperture for engaging a bolt or screw, and an arm projecting from the underside of said fastener base and extending in the same general direction, said arm being smaller than said fastener base and having an open area providing a bolt or screw passage aligned with said aperture in the fastener base, said arm being of such size as to be fully receivable in the opening in said part from one side of said part to extend through said opening and engage the other side of said part adjacent said opening and thereby cooperate with the fastener base in engaging opposite sides of said part to retain the fastener in attached position on said part, said arm defining a pair of spaced projecting shoulders adjoining the fastener base adapted to engage spaced wall portions of said opening, and another pair of spaced shoulders on said arm adapted to engage wall portions of said opening in spaced relation to said pair of projecting shoulders.

GEORGE A. TINNERMAN.

REFERENCES CITED

The following references are of record in the file of this patent:

UNITED STATES PATENTS

| Number | Name | Date |
|---|---|---|
| 2,252,904 | Todd | Aug. 19, 1941 |
| 2,258,845 | Burke | Oct. 14, 1941 |
| 2,382,942 | Murphy | Aug. 14, 1945 |
| 2,384,508 | Tinnerman | Sept. 11, 1945 |
| 2,451,591 | Tinnerman | Oct. 19, 1948 |